May 22, 1951      B. COHEN      2,554,012
HUNTING ARROW
Original Filed Sept. 24, 1945
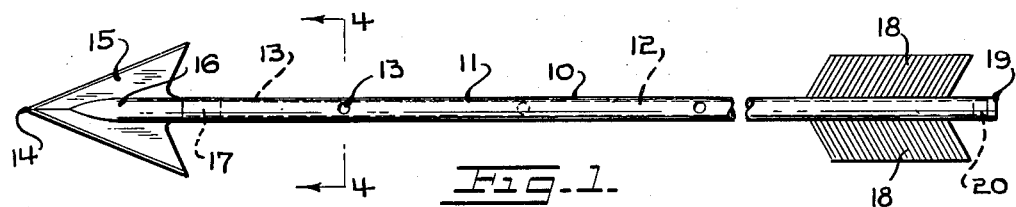
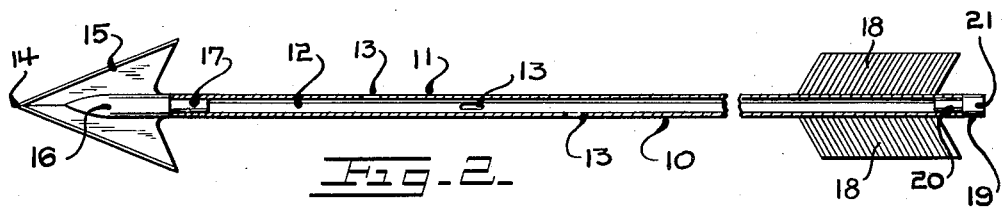
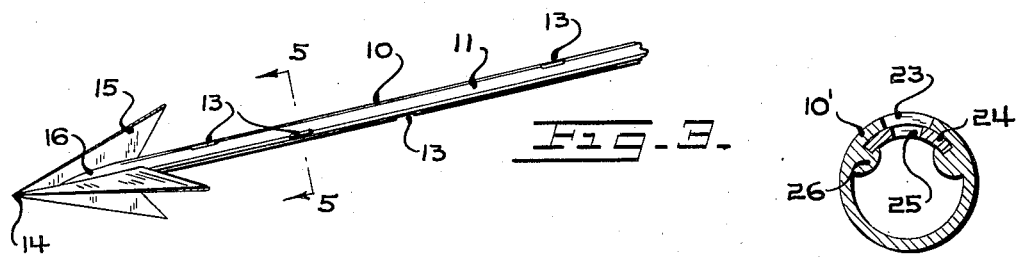
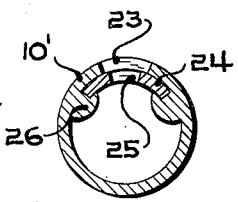
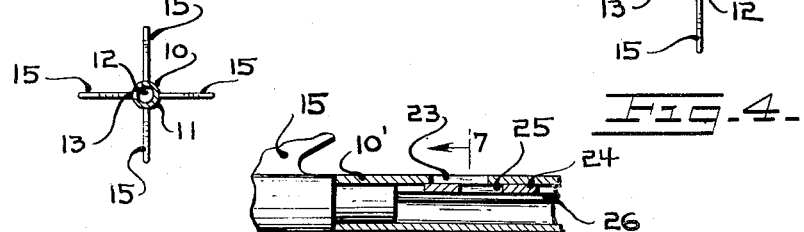
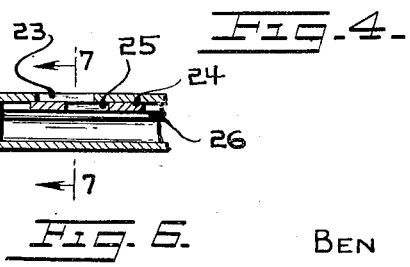
INVENTOR
BEN COHEN
BY
ATTORNEY Patented May 22, 1951

2,554,012

UNITED STATES PATENT OFFICE 2,554,012

HUNTING ARROW

Ben Cohen, Lake Hiawatha, N. J.

Substituted for abandoned application Serial No. 618,112, September 24, 1945. This application April 21, 1949, Serial No. 88,827

7 Claims. (Cl. 273—106.5)

This invention relates to a new and novel type of hunting arrow useful when hunting a wide variety of game and constituting a great improvement over hitherto used hunting instruments. This is a substitute for my abandoned application filed on September 24, 1945, Serial Number 618,112.

The new arrow does away with cruelty inherent in all well-known types of hunting arms. Such arms cause frequently unnecessary loss of wounded game and great suffering borne by these animals. In spite of this great advantage the new device is very economical and easy to make, assemble and carry around. It has also been found capable of fast operation and the same instrument will be reused many times after its first application.

In its preferred form reduced to its simple elements the new device consists of a missile having a sharp point and an elongated hollow shaft having a plurality of holes placed along its cylindrical walls.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side view of an embodiment of the instant invention.

Fig. 2 is a view similar to Fig. 1, showing another embodiment of the instant invention, shown partly in section.

Fig. 3 is a partial perspective view of an instrument made in accordance with a still further modified form of the invention.

Fig. 4 is a vertical sectional view taken on the line 4—4 of Fig. 1.

Fig. 5 is a vertical sectional view taken on the line 5—5 of Fig. 3.

Fig. 6 is an enlarged fragmentary view, showing a further modified form of the invention.

Fig. 7 is an enlarged sectional view taken on the line 7—7 of Fig. 6.

In accordance with a preferred form of the instant invention the missile consists of an elongated narrow cylindrical shaft 10 hollow inside and having relatively narrow walls 11 forming the boundaries of a lengthwise wide hollow 12 existing along substantially the whole length of said shaft 10.

The shaft 10 has its walls 11 perforated by holes 13 which should be large enough to permit ready entrance of even relatively viscous liquid into the interior 12 of the shaft and exit therefrom. These holes can be placed one directly below the other following a straight line along the outside of the shaft in parallel with its axis but it has often been found advantageous to place successive openings 13 below each other following an imaginary helical line around the outside walls of the shaft and their projection into a plane perpendicular to the axis of shaft 10 may conveniently appear at right angles to each other.

In accordance with one greatly preferred embodiment of the invention, the missile will have a point 14 located at one extremity of the shaft 10 which point may be the meeting point of a plurality of sharp blades 15, part of an arrow head 16 which may be removably, readily fitted inside the hollow 12 of said shaft 10 by means of block 17 rigidly attached to said arrow head 16.

As is common to many missiles of this type the shaft 10 may support, at end opposite the end supporting said arrow head 16, directionally stabilizing fins 18. The very end of the hollow shaft 10 may be closed off by means of a closure 19 comprising a narrow block 20 tightly fitting into the hollow 12 of said shaft 10. The closure 19 may have a transverse depression 21 fitting the string of a bow.

It will be readily seen that the holes 13 may be perfectly round as shown in Fig. 1 or somewhat elongated in either direction as shown in Figs. 2 and 3. The arrow head 16, of course, may support any desired number of blades. As for the shaft 10 it can be conveniently made from light metal, plastic or natural hollow materials and due to its hollow nature will have a long reach even when constructed of steel or heavier material. The closure 19 at the end may be made of bone, plastic, rubber, metal, etc., the only requisite being a good fit onto said shaft 10.

In Fig. 6, the size of the front opening 23 is shown to be adjustable by a slide member 24 having a second opening 25. This slide member is held frictionally in the slide guides 26 formed in the shaft 10'.

One additional advantage inherent in this type of structure is that the front and back portions of this missile will be readily replaceable and interchangeable when using a device in accordance with this invention.

The device of the present invention is used in the conventional way as missiles of this kind usually are. However, when an animal is hit and its body is pierced by the arrow head and followed by the hollow shaft, the wound will not remain completely closed so as to prolong its struggle, but blood will enter the interior 12 of the shaft through openings 13 of that portion of the shaft located within the animal's body and then flow outward through the shaft and discharge from the shaft through the openings 13 in that portion of the shaft located outside of the animal's body. The animal will thus greatly weaken through loss of blood and its trail will be readily recognizable by man and dog due to the blood on the ground.

A new and improved missile for use with many types of hunting instruments and in hunting many types of game inhabiting the firm earth and the sea has been created. Its advantages are absence of cruelty, easy detection of the game once it has been hit, simplicity, cheapness, and easy handling.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. For use in hunting wild game, a missile hollow throughout its length having relatively thin walls formed with a plurality of holes, a pointed forward end comprising a plurality of angular blades on an arrow head, and a stopper at the opposite end of said missile closing the opposite end of said hollow.

2. For use in hunting wild game, a missile, hollow throughout its length, having relatively narrow walls perforated in parts and having a pointed forward end, said holes being located along an imaginary helical line along the outer walls of said missile.

3. For use in hunting wild game, a missile, hollow throughout its length, having relatively narrow walls perforated in parts and having a pointed forward end, said holes being located along an imaginary helical line along the outer walls of said missile and at substantially right angles to each other.

4. For use in hunting wild game, a missile, hollow throughout its length, having relatively narrow walls perforated in parts and having a pointed forward end, said holes being perfectly round.

5. For use in hunting wild game, a missile, hollow throughout its length, having relatively narrow walls perforated in parts and having a pointed forward end, said holes being longitudinal.

6. An arrow comprising a hollow shaft having a head at its front end and its rear end closed, an enlarged entrance opening formed in said shaft closely adjacent said head, discharge openings formed in said shaft rearward from said entrance opening, and means for controlling the operative size of said entrance opening.

7. An arrow comprising a hollow shaft having a head at its front end and its rear end closed, an enlarged entrance opening formed in said shaft closely adjacent said head, discharge openings formed in said shaft rearward from said entrance opening, and means for controlling the operative size of said entrance opening, said controlling means comprising a slide frictionally slidably mounted within said hollow shaft over said entrance opening, said slide being formed with an opening of a size corresponding to the size of said entrance opening and alignable with said entrance opening in the various adjusted positions of said slide with said shaft.

BEN COHEN.

REFERENCES CITED

The following references are of record in the file of this patent:

UNITED STATES PATENTS

| Number | Name | Date |
| --- | --- | --- |
| 1,328,967 | Reaben | Jan. 27, 1920 |
| 1,604,713 | Norlund | Oct. 26, 1926 |
| 1,842,540 | Cowdery | Jan. 26, 1932 |
| 2,125,591 | Smith | Aug. 2, 1938 |
| 2,467,833 | Lust | Apr. 19, 1949 |